United States Patent Office 3,382,039
Patented May 7, 1968

3,382,039
PREPARATION AND USE OF SILVER ZEOLITES OF IMPROVED EXCHANGE CAPACITY
Calvin Calmon, Birmingham, and Warren T. Grundner, Vincentown, N.J., assignors to Ritter Pfaudler Corporation, Rochester, N.Y., a corporation of New York
No Drawing. Filed Nov. 17, 1965, Ser. No. 508,359
7 Claims. (Cl. 23—112)

ABSTRACT OF THE DISCLOSURE

A crystalline silver alumino silicate zeolite having a low $SiO_2/Al_2O_3$ mole ratio is produced by contacting a crystalline metallo alumino silicate zeolite first with an excess aqueous solution of sodium hydroxide, then with an excess aqueous solution of silver nitrate and then rinsing the zeolite of excess silver until the pH of the rinse water is not less than 9.5 nor greater than 11.0, all the treating and rinsing solutions being free of dissolved carbon dioxide.

---

The invention relates to a process for preparing crystalline silver zeolites of improved exchange capacity, and their use in providing potable water from saline waters in shorter time intervals.

Zeolites, which is to say metallo alumino silicates, and especially silver zeolites have found valuable use as ion exchangers in the preparation of potable water from saline waters among others. Commonly, silver zeolites are of two kinds, those in an "amorphous" state which show no definite regular X-ray pattern, the preparation of which is such as is disclosed in the Calmon patent U.S. 2,512,053, and those silver zeolites which have a regular "crystalline" form having a $SiO_2/Al_2O_3$ mole ratio less than 6 such as Milton discloses in his patents U.S. 2,882,243 and 2,882,244. The state of the art and the sundry definitions of terms represented in these publications are included herein by reference.

The art has constantly sought methods for increasing the capacity of exchangers such as zeolites to remove greater quantities of salt or more specifically chlorides, from saline waters at lower cost, using less zeolite, and, in all, with a greater efficiency per unit time per unit volume of potable water produced. This nettlesome problem has become all the more pressing with the advent of the space age wherein astronauts landing at sea, often in a state of pronounced dehydration, require large and immediate quantities of potable water until they are picked up. The silver zeolites which are presently used by astronauts to provide potable water, and those in the survival kits of aviators are essentially of the Calmon type as disclosed in U.S. 2,512,053, and are in the form of "briquets," a convenient brick-like form that is of compressed amorphous silver zeolite and inert adjuvants. The weight problem engendered in space lift-off necessarily limits the amount of zeolites that may be taken. As safety equipment needs become more complex in such endeavors, a reduction in the weight of many of the essential items in the survival equipment becomes essential. Further, with the increased weight and height of the average man with time over the past generations, it has necessitated a concomitant reduction in the weight limit of the survival equipment. Thus, one may clearly see the desirability of boosting the exchange capacity of silver zeolites per unit weight in any given time interval to provide more quickly adequate quantities of potable water. It is to these ends that the invention is directed.

An object of this invention is to provide a process for substantially boosting the exchange capacity of silver zeolites over that of the known silver zeolites.

Another object of this invention is to provide a simple process for producing silver zeolites which in turn can provide substantially increased quantities of potable water from saline water per unit weight of zeolite in any given time interval.

Another object of this invention is to provide an improved method for desalting saline waters.

Other desirable objects of the invention will become apparent from or are inherent in the descriptions, explanations and examples which follow.

The foregoing objects are substantially met by the instant discovery that crystalline sodium form zeolites may be treated according to the process of this invention so as to provide crystalline silver zeolites of substantially increased exchange capacities per unit weight of zeolite and per unit time of contact with saline waters over any silver zeolites heretofore known to the art.

According to the invention, crystalline sodium form zeolites, such as those commercially produced, are treated by (a) contact with an aqueous alkali metal hydroxide, (b) separated therefrom, and then (c) sequentially treated by contact with and separation from portions of an aqueous solution of a water soluble silver salt until the ultimate portion shows practically little or no diminution of silver ion content; the excess silver salt adhering to the zeolite is then separated from the now formed crystalline silver zeolite product of boosted exchange capacity by a sequential washing therefrom with portions of de-ionized and carbon dioxide-free water until according to the invention the ultimate portion of wash water shows a pH that is not less than about 9.5 nor greater than about 11.0 and also a substantial absence of silver ion.

The crystalline sodium zeolites used in the instant process are any of such zeolites which may be prepared by any of the methods and are of any of such structures which are known in the art, such as those disclosed by Milton in the aforesaid patents.

The aqueous alkali metal hydroxides which may be used in the instant process include any of those formed with Group IA metals such as are designated by the Periodic Table of Elements. Aqueous sodium and potassium hydroxide solutions are preferred, and aqueous sodium hydroxide solutions are most preferred for present use. Such solutions are employed according to the invention in useful concentrations of from about 0.1% to 20% by weight of the alkali metal hydroxide dissolved in carbon dioxide-free de-ionized or demineralized water. The preferred range of alkali metal hydroxide concentrations is from about 1% to 10% by weight, and the most preferred concentration range is from about 5% to 10% by weight.

The aqueous silver salt solutions which may be used contain according to the invention between about 0.1% and 15% by weight of any of the water soluble and dissociable silver salts, such as the nitrate which is preferred for present use. Again water that is substantially free of other foreign cations and anions and carbon dioxide should be used, such as de-ionized or demineralized water, as the solvent therefor. Distilled water also may be used, providing that it is boiled to remove residual dissolved carbon dioxide.

In practicing the process here taught, the contact time of reactants, the separation of the resulting products, the kind of water used, and the prescriptions of pH and metal content of the final wash water of the crystalline silver zeolite of boosted exchange capacity represent important factors in providing a zeolite which will achieve the objects of the invention. Although the reasons for this are not fully understood at this time, it is believed that contact times of between 0.5 minute to about 24 hours of an aqueous 0.1% to 20% by weight alkali metal hydroxide solution with the sodium form of crystalline zeolite is needed to effect a complete exchange of the hydrogen cation of the zeolite with the alkali metal cation of the aqueous alkali metal hydroxide solution. In the Milton process for making the sodium form of crystalline zeolites, which is also the commercial method, we now believe that not all of the exchangeable cationic sites produced in the zeolite products after rinsing are occupied by sodium ion, but that in said preparation an equilibrium is produced between sodium ion and unexchangeable ions such as hydrogen ion and such that in the Milton or commerical zeolite product at least some of the sites are occupied by the preferentially held ions and most probably hydrogen ion, often to the extent of even 10% to 20% of the total sites available. The commercial sodium form zeolites it is felt thus having hydrogen ion occupied sites can exchange silver for sodium ions only. In general, zeolites seem to have a very strong preference for hydrogen ion when at relatively high pH values, and thus silver salt treatment per se, such as is disclosed by the Calmon patent, will not substantially displace or exchange silver ions with the hydrogen present as the result of either the Milton or Calmon processes. Nevertheless, whatever the true reasons may be, the instant process substantially boosts the exchange capacities of silver zeolites per unit time in providing potable water from saline waters. It is believed that the safeguards presented by the instant process through the intervening step of alkali metal caustic treatment, use of foreign ion and carbon dioxide-free water in the treatments, and the assurance of relatively high pH values of the treated waters, including both the ultimate portion of wash water and of saline waters made potable thereby, prevent a premature occupancy of substantial numbers of exchange sites by unexchangeable species such as hydrogen.

The postulated general mechanism for preparing silver zeolites from alkali metal zeolites, and of use of such silver zeolites to prepare potable water from saline waters is well known. It comprises exchange of exchangeable alkali metal ions from the zeolite for silver ions, and subsequent exchange of silver ions for the sodium ions of sea water. Thereupon the newly freed silver ions react with chloride ions of the sea water to precipitate out insoluble and separable silver chloride. The instant invention represents a substantial advance in providing silver zeolites of boosted capacity per unit time to do this.

The improved process of this invention for treatment of saline waters to provide potable water involves the critical step of contact of silver zeolites made by the process of this invention with saline water in such effective concentrations and quantities of each as to provide an aqueous liquid having at most 3,000 parts per million (p.p.m.) of chloride in terms of $CaCO_3$ and a pH not exceeding 11 in at most about 30 minutes.

Thus, now for the first time, it is possible through the teachings of this invention to provide reasonably large quantities of potable water at common room temperatures using smaller quantities of silver zeolites than required in the prior art, which smaller weight quantities are now practical for use in the survival kits of astronauts, aviators and passengers and in shorter intervals of time when briquets formed with silver zeolites according to the process of the present invention are used. It has now been found that the silver zeolites of increased exchange capacity react faster with sea water salts so that potable water may be obtained therewith in far shorter times than heretofore, even when the water temperature may be close to freezing.

For the purpose of practicing this invention, crystalline potassium type zeolites may be used in place of the crystalline sodium type zeolites described above and are equivalent thereto. Further, temperatures between the freezing and boiling points of the aqueous solutions may be used herein, however the most useful temperatures are those between 32° F. and 120° F., the common ambient or "room" temperatures. Yet further, the water and chemicals used to prepare the alkali metal hydroxide and silver salt aqueous solutions while necessarily free of carbon dioxide or its variants such as carbonic acid or carbonates or bicarbonates, permissibly may contain innocuous quantities of innocuous substances such as adjuvants which will not detract from the preparation of silver zeolites of boosted exchange capacity by the present teachings. Practitioners will readily recognize that the present process for preparing zeolites of boosted exchange capacity and their use in desalinating water may be carried out in batch fashion, intermittently, or continuously. Also practitioners will readily recognize that when "portions" of silver nitrate solution or wash water are designated or prescribed as necessary, within the meaning of the invention, this also may be substantially accomplished by a single portion of silver salt solution in contact with the alkali metal hydroxide treated zeolite for a prolonged period of time until substantially little or no change in silver content of the solution occurs with time, and in the instance of wash water a single portion may be used in prolonged contact until the silver content of the solution provided no longer increases with time. Use of single portions in this or another obvious way to substantially accomplish the same ends as are achieved by the plurality of portions designated herein, is to be considered equivalent thereto for the purpose of this invention. The following examples describe in detail modes of practicing the invention while, however, not defining the scope. Practitioners, from the teachings herein, will readily see how the described process conditions given by the examples such as types of chemical reactants and adjuvants, their concentrations, contact times, temperatures, number of treatments and washings and relative quantities of the different substances employed may be varied and yet withal come within the purview of the claims to attain the present objects.

In general, tests for chloride capacities were made according to the standard procedures of the American Public Health Association; the tests for silver content were made by the standard Mohr method using sodium chloride solutions of known concentration. For potable water, the accepted standard for chloride ion content is a maximum of 3,000 parts per million (p.p.m.) as $CaCO_3$ and for pH is a maximum of 11.0. The "standard sea water" used is as was defined by Calmon in U.S. 2,512,053, column 5 therein. The conversion factor for milliequivalents per liter of chloride in water to parts per million in water of chloride calculated as $CaCO_3$ is 40 meq=2,000 p.p.m.

EXAMPLE ONE

A 5% by weight aqueous sodium hydroxide solution prepared with de-ionized and carbon dioxide freed water was slurried with 1,000 grams of a commercially prepared crystalline sodium form of zeolite such that the volume of solution exceeded the volume of zeolite, for about one hour at common room temperatures and at atmospheric pressure. At the conclusion of the interval, the solids were substantially separated from the mother liquors by vacuum filtration. The solids were then sequentially slurried to provide contact with a volume excess, namely three liter portions, of aqueous ten weight percent silver nitrate solution that had been prepared using demineralized, that is to say de-ionized, and carbon dioxide freed water at common room temperatures and atmospheric pressure, and then separated therefrom by vacuum filtration according to the schedule as follows:

| Portion No. | Contact time interval in hours |
|---|---|
| 1 | 16 |
| 2 | 8 |
| 3 | 72 |
| 4 | 24 |
| 5 | 24 |

The ultimate, that is to say the last or fifth, portion of aqueous silver nitrate solution used after its contact interval showed no diminution in silver ion concentration. This indicated no further silver ion exchange had occurred with sodium or other exchangeable ions during the ultimate interval, and thus exchange was substantially complete at sometime during a preceding contact interval. The solids, following separation at the end of the ultimate silver nitrate contact interval, were washed at common room temperatures and atmospheric pressure with one liter of demineralized and carbon dioxide freed water, and similarly separated therefrom. Substantially all non-reacted silver nitrate is removed thereby. The effluent wash water had a pH of not less than 9.5. The separated, caustic and silver treated, washed zeolite was then dried overnight at about 140° C. The dried crystalline silver zeolite product of this process was obtained in 1,686 g. yield, and had an analyzed exchange capacity for chloride ion of 4.49 meq. per gram of product when tested at 74° F. in a 30 minute contact interval.

EXAMPLE TWO

In generally similar manner to Example One, a commercially prepared crystalline sodium form zeolite was treated with aqueous sodium hydroxide, aqueous silver nitrate, washed with demineralized and carbon dioxide freed water and dried under comparable conditions in and with comparable concentrations, testing, and results to yield a crystalline silver zeolite product of this process with a chloride capacity of 4.20 meq. per gram of zeolite product at 74° F. in 30 minutes.

EXAMPLE THREE

Two portions of an identical commercially prepared crystalline sodium form zeolite were treated, one according to the process of this invention, and the other in otherwise identical manner but excluding the caustic treatment step, to provide respectively a crystalline silver zeolite of the invention hereinafter designated "Caustic Treated Sample," and a crystalline silver zeolite of the prior art hereinafter designated "Prior Art Sample." The respective samples were each contacted with "standard sea water," 5 g. of zeolite with 50 ml. of saline water, over identical intervals of time at the same temperature and otherwise identical conditions to provide upon comparable analysis the results for zeolites and waters obtained therewith as listed.

|  | Caustic Treated Sample | Prior Art Sample |
|---|---|---|
| pH of treated water, after slurry | 10.0 | 8.8 |
| Chloride Content of Treated Water, p.p.m. as CaCO₃ | 2,651 | 4,709 |
| Potability of Treated Water | Yes | No |
| Chloride Capacity, meq./g. of zeolite | 4.50 | 4.00 |
| Percent Difference in Chloride Capacity with respect to Prior Art Sample | +11.25 | |

EXAMPLE FOUR

This example compares the chloride capacities in comparable time intervals of a typical crystalline silver zeolite prepared by the process of the invention such as in the preceding examples with a prior art amorphous silver zeolite prepared by the Calmon process of U.S. 2,512,053 when in the form of briquets, the form commonly used in survival kits. Hereinafter they are respectively designated "Caustic Treated Briquet" and "Prior Art Briquet." In the formulations employed, the adjuvants therein are substantially inert to enhancing or decreasing the chloride capacity of the zeolites and thus the ability of the respective zeolites to desalinate sea water. The respective briquets were of comparable size and compressed to form under comparable pressures.

|  | Caustic Treated Briquet | Prior Art Briquet |
|---|---|---|
| Briquet Density, in g./cc | 1.7 | 1.6 |
| Formulations in Parts by Weight: | | |
| Silver Zeolite | ¹ 100.00 | ² 100.00 |
| Adjuvants, Total | 2.98 | 11.53 |
| Total Parts by Weight | 102.98 | 111.53 |

¹ Made by process of the invention.
² Made by process of U.S. 2,512,053.

The briquets were slurried with known concentration aqueous sodium chloride solutions to determine chloride capacity by the standard procedures of the art. Two slurrying temperatures were used for the Caustic Treated Briquet, 32° F. which temperature is common to Arctic and Antarctic waters, and also 74° F. which is a standard laboratory test temperature for such determinations. The Prior Art Briquet was slurried at 32° F. The chloride capacities both of the briquets and of the respective zeolites therein, which later were calculated from the former using the equation wherein the capacity of the respective zeolite equals the ratio $$\frac{\text{capacity of briquet} \times \text{formulation weight of briquet}}{\text{formulation weight of zeolite}}$$

The calculations for chloride capacity not only compare the relative efficacies of the briquets themselves, but make clearly evident the boosted exchange capacities of the zeolites themselves prepared by the process of the invention over the prior art zeolites. The percent differences listed are based on the capacities of the prior art briquet and zeolite as 100%.

BRIQUETS

| Slurrying | | Chloride Capacities | | |
|---|---|---|---|---|
| Time (min.) | Temperature (° F.) | Prior Art Briquet (meq./g.) | Caustic Treated Briquet (meq./g.) | Percent Difference |
| 30 | 32 | 2.76 | 3.93 | +42.4 |
| 30 | 74 | | 4.33 | |
| 60 | 32 | 2.98 | 3.97 | +33.2 |
| 60 | 74 | | 4.46 | |

ZEOLITES

| Slurrying | | Chloride Capacities | | |
|---|---|---|---|---|
| Time (min.) | Temperature (° F.) | Prior Art Briquet (meq./g.) | Caustic Treated Briquet (meq./g.) | Percent Difference |
| 30 | 32 | 3.08 | 4.05 | +31.8 |
| 30 | 74 | | 4.46 | |
| 60 | 32 | 3.32 | 4.08 | +22.9 |
| 60 | 74 | | 4.59 | |

As will be noted from the foregoing tables, at an equivalent temperature and time the capacity of the zeolite formed by the present process for chloride removal from saline water was not only substantially greater than that of a common zeolite of the prior art, but as seen from the following table the exchange capacity of the zeolite formed by the process of the invention when used even with a 10 minute slurry time was greater than that of the prior art zeolite even after a 60 minute slurry time.

BRIQUETS

| Slurrying | | Chloride Capacities | | |
|---|---|---|---|---|
| Time (min.) | Temperature (° F.) | Prior Art Briquet (meq./g.) | Caustic Briquet (meq./g.) | Percent Difference |
| 10 | 32 | | 3.61 | +21.1 |
| 60 | 32 | 2.98 | | |

ZEOLITES

| Slurrying | | Chloride Capacities | | |
| --- | --- | --- | --- | --- |
| Time (min.) | Temperature (° F.) | Prior Art Briquet (meq./g.) | Caustic Briquet (meq./g.) | Percent Difference |
| 10 | 32 | -------- | 3.62 | +9.0 |
| 60 | 32 | 3.32 | -------- | -------- |

Therefore, in view of the foregoing teachings, and with the understanding that the suggested conditions and materials enunciated thereby are merely illustrative and that many variations may be made by practitioners versed in the art and yet fall within the scope of the following definitions.

We claim:
1. A process for preparing crystalline silver zeolites of improved exchange capacity which comprises:
   (A) Exchanging substantially all exchangeable zeolite cations with alkali metal ions by contacting crystalline sodium form zeolite with carbon dioxide free aqueous alkali metal hydroxide, and then separating the liquids and solids obtained;
   (B) Exchanging substantially all alkali metal zeolite ions with silver ions by contacting the separated solids of step A with carbon dioxide free aqueous silver salt solution, then separating the liquids and solids obtained; and
   (C) Removing substantially all excess silver salt from the solids of step B by washing them with carbon dioxide free water until the pH of the water is not less than 9.5 nor greater than 11.0.

2. A process according to claim 1 wherein said alkali metal hydroxide is selected from the hydroxides of alkali metals consisting of sodium hydroxide and potassium hydroxide, and wherein the concentration of alkali metal hydroxide in said aqueous solution is from about 0.1 to about 20 weight percent.

3. A process according to claim 2 wherein said alkali metal hydroxide is sodium hydroxide.

4. A process according to claim 1 wherein said silver salt is silver nitrate.

5. A process according to claim 1 wherein said contacting of step B occurs in a contact time in the range of from about 0.5 minute to about 24 hours.

6. A process according to claim 1 wherein at least one of said aqueous silver salt solution of step B and of said carbon dioxide free water of step C is used in the form of a plurality of portions.

7. The zeolite product of the process of claim 1.

References Cited

UNITED STATES PATENTS

| 2,512,053 | 6/1950 | Calmon | 23—113 |
| 2,882,243 | 4/1959 | Milton | 252—455 X |
| 3,326,797 | 6/1967 | Young | 252—455 X |

DANIEL E. WYMAN, *Primary Examiner.*

CARL F. DEES, *Assistant Examiner.*